United States Patent
Jarrot et al.

(10) Patent No.: US 12,529,303 B2
(45) Date of Patent: Jan. 20, 2026

(54) SMART DATA ACQUISITION FOR GYROCOMPASS APPLICATIONS

(71) Applicant: Schlumberger Technology Corporation, Sugar Land, TX (US)

(72) Inventors: Arnaud Jarrot, Clamart (FR); Makito Katayama, Cheltenham (GB); Arnaud Croux, Paris (FR); Joffroy Urbain, Cheltenham (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 304 days.

(21) Appl. No.: 18/453,369

(22) Filed: Aug. 22, 2023

(65) Prior Publication Data

US 2025/0067166 A1    Feb. 27, 2025

(51) Int. Cl.
*E21B 47/02* (2006.01)
*E21B 47/0224* (2012.01)

(52) U.S. Cl.
CPC ................. *E21B 47/0224* (2020.05)

(58) Field of Classification Search
CPC ............. E21B 47/0224; E21B 47/022
See application file for complete search history.

(56) References Cited

U.S. PATENT DOCUMENTS

| | | |
|---|---|---|
| 6,381,858 B1 | 5/2002 | Shirasaka |
| 6,480,119 B1 | 11/2002 | McElhinney |
| 8,528,220 B2 | 9/2013 | Magosaki |
| 10,982,530 B2 | 4/2021 | Igarashi |
| 2002/0133958 A1* | 9/2002 | Noureldin ............ G01C 21/166 33/304 |
| 2004/0089474 A1* | 5/2004 | Noureldin ............ G01C 21/183 175/45 |
| 2005/0022402 A1 | 2/2005 | Ash |
| 2013/0211723 A1* | 8/2013 | Weston .................. G01P 21/00 702/6 |
| 2013/0261974 A1* | 10/2013 | Stewart ................. G01V 5/125 250/269.3 |
| 2017/0052275 A1* | 2/2017 | Kilshaw ................. G01V 5/12 |
| 2018/0266239 A1 | 9/2018 | Jarrot |
| 2022/0403733 A1* | 12/2022 | Lloyd .................... E21B 47/26 |

FOREIGN PATENT DOCUMENTS

KR    102112874 B1    5/2020

\* cited by examiner

*Primary Examiner* — Francis C Gray
(74) *Attorney, Agent, or Firm* — Jeffrey D. Frantz (57) ABSTRACT

A method for making gyroscopic azimuth measurements includes estimating a pitch angle and a roll angle of a gyroscopic surveying tool in a wellbore; determining a measurement duration for each of a plurality of gyroscope measurements from the estimated pitch and roll angles; making each of the plurality of gyroscope measurements at the determined measurement duration when the gyroscope is disposed at a corresponding plurality of rotational positions in the tool housing; and computing an azimuth of the wellbore from the plurality of gyroscope measurements.

20 Claims, 4 Drawing Sheets

SMART DATA ACQUISITION FOR GYROCOMPASS APPLICATIONS

FIELD

Disclosed embodiments relate generally to downhole gyroscopic surveying methods and more particularly to a smart data gyroscopic data acquisition method for improving the accuracy of a downhole surveying operation.

BACKGROUND

In conventional drilling and measurement while drilling (MWD) operations, wellbore inclination and wellbore azimuth are commonly measured at a discrete number of longitudinal points along the axis of the wellbore. These discrete measurements may be assembled into a survey of the well and used to calculate a three-dimensional well path (e.g., using the minimum curvature assumption or other curvature assumptions). Wellbore inclination is commonly derived (computed) from accelerometer measurements of the earth's gravitational field. Wellbore azimuth may be derived from a combination of accelerometer and magnetometer measurements of the earth's gravitational and magnetic fields.

In certain drilling operations magnetic interference from nearby wells or magnetic ore bodies can introduce errors in the computed magnetic azimuth. Wellbore azimuth may also be derived (computed) from a combination of accelerometer measurements and gyroscopic measurements of the earth's rotation. While such gyroscopic azimuth measurements are commercially utilized, there is room for further improvement, for example, to improve measurement accuracy.

SUMMARY

A method and system for making gyroscopic azimuth measurements is disclosed. One example method includes deploying a gyroscopic surveying tool in the wellbore, the gyroscopic surveying tool including at least one gyroscope disposed to rotate in and with respect to a tool housing; estimating a pitch angle and a roll angle of the gyroscopic surveying tool in the wellbore; determining a measurement duration for each of a plurality of gyroscope measurements from the estimated pitch and roll angles; making each of the plurality of gyroscope measurements at the determined measurement duration when the gyroscope is disposed at a corresponding plurality of rotational positions in the tool housing; and computing an azimuth of the wellbore from the plurality of gyroscope measurements.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

The disclosed methods for making gyroscopic surveying measurements include deploying a gyroscopic surveying tool in the wellbore, the gyroscopic surveying tool including at least one gyroscope disposed to rotate in and with respect to a tool housing; estimating a pitch angle and a roll angle of the gyroscopic surveying tool in the wellbore; determining a measurement duration for each of a plurality of gyroscope measurements from the estimated pitch and roll angles; making each of the plurality of gyroscope measurements at the determined measurement duration when the gyroscope is disposed at a corresponding plurality of rotational positions in the tool housing; and computing an azimuth of the wellbore from the plurality of gyroscope measurements.

Example embodiments disclosed herein may provide various technical advantages and improvements over the prior art. For example, the disclosed embodiments may provide for gyroscopic azimuth measurements during drilling operations having improved accuracy. Moreover, the disclosed embodiments advantageously enable the gyroscope measurement to be tuned throughout a drilling operation, thereby enabling high accuracy gyroscopic azimuth measurements to be made throughout.

Figure 1:
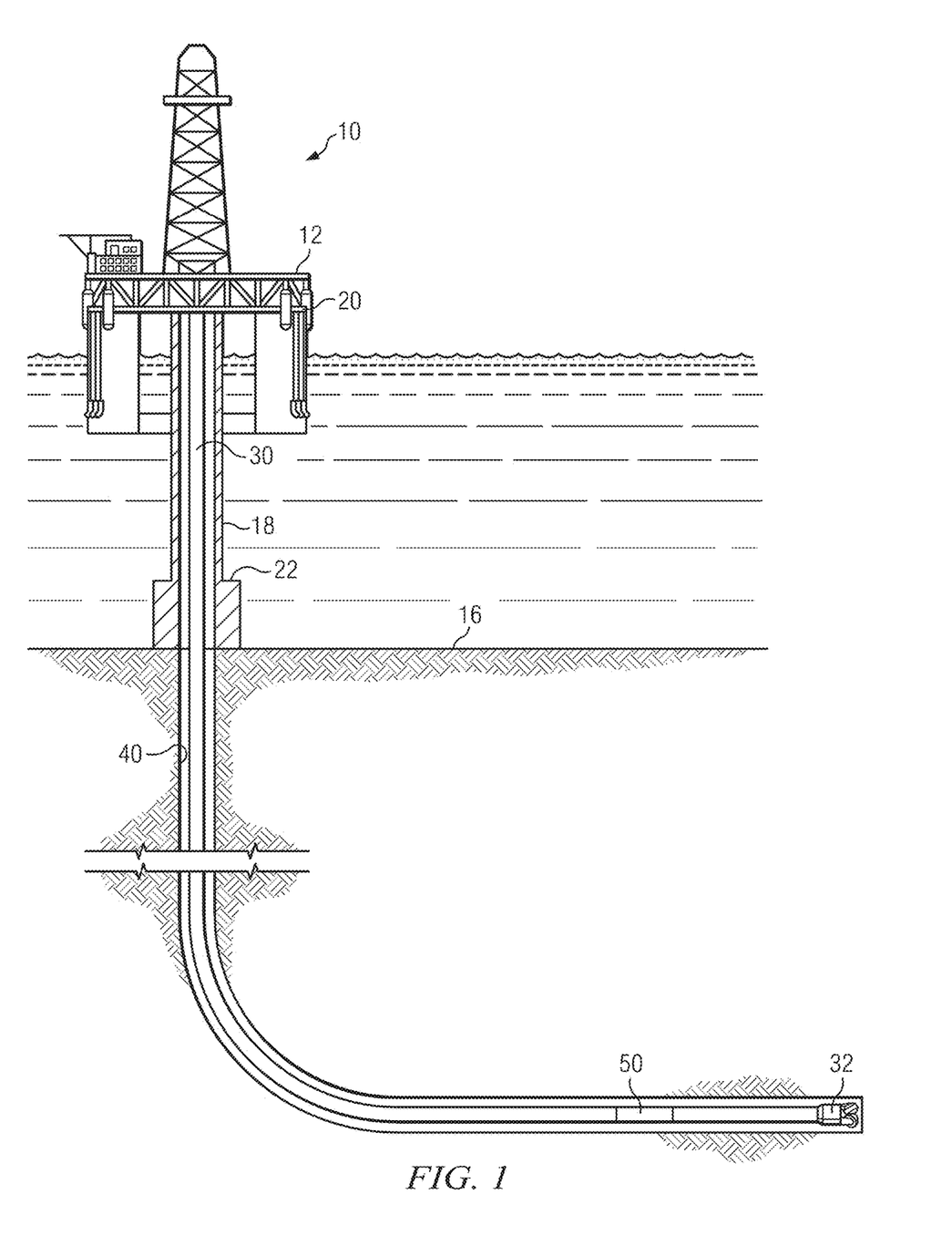
FIG. 1 depicts a drilling rig including one example gyroscopic surveying tool.

FIG. 1 depicts a drilling rig 10 suitable for implementing various method embodiments disclosed herein. A semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering a drill string 30, which, as shown, extends into wellbore 40 and includes a drill bit 32 and a gyroscopic surveying tool 50. Drill string 30 may further include a downhole drilling motor, a downhole telemetry system, a rotary steerable tool, and one or more other measurement while drilling (MWD) or logging while drilling LWD tools including various sensors for sensing downhole characteristics of the wellbore and the surrounding formation. The disclosed embodiments are not limited in these regards.

As described in more detail below, example embodiments of the gyroscopic surveying tool 50 may include a gyroscopic sensor arrangement having a single gyroscopic sensor or a gyroscopic sensor arrangement having two gyroscopic sensors (a dual sensor arrangement). The gyroscopic sensor(s) may include substantially any suitable gyroscopic sensor for making measurements in a drill string, such as a micro electro mechanical systems (MEMS) gyroscope. As known to those of ordinary skill in the art, such MEMS gyroscopes are fabricated using integrated circuit fabrication technology and are used in a wide range of applications including spacecraft, aircraft, underwater devices, motor vehicles, gaming devices, and smart phones.

It will be understood by those of ordinary skill in the art that the deployment illustrated on FIG. 1 is merely an example. It will be further understood that disclosed embodiments are not limited to use with a semisubmersible platform 12 as illustrated on FIG. 1. The disclosed embodiments are equally well suited for use with any kind of subterranean drilling operation, either offshore or onshore.

Figure 2:
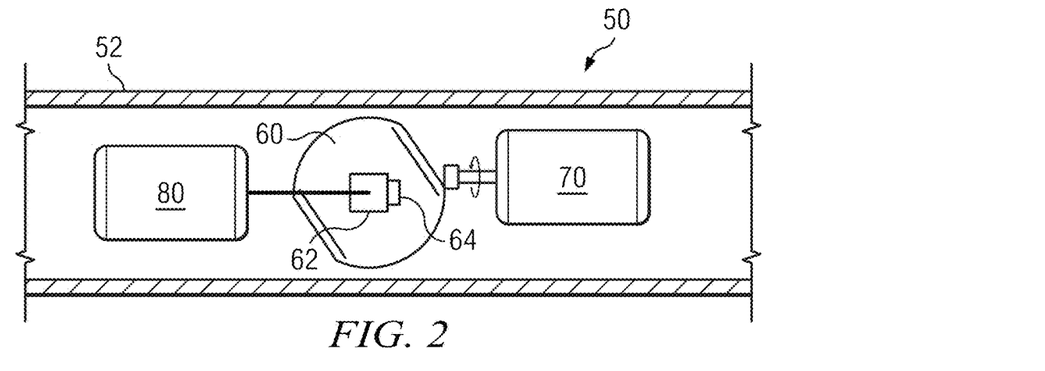
FIG. 2 depicts a cross section of an example gyroscopic surveying tool.

FIG. 2 depicts an example embodiment of gyroscopic surveying tool 50. In the depicted example embodiment, a gyroscope sensor housing 60 is configured to be rotated in a tool body 52. The sensor housing 60 may include either one or two gyroscopes 62 deployed therein (e.g., inductive-type MEMS gyroscope). One or more accelerometers 64, at least one of which has a measurement axis aligned with the measurement axis of the gyroscope 62, may also be deployed on or in the gyroscope sensor housing 60.

Gyroscopic surveying tool 50 further includes an electric motor 70 (e.g., an electric stepper motor) deployed in the tool body 52 and configured to sequentially rotate the gyroscope sensor housing 60 (and gyroscope 62) through a plurality of measurement positions (e.g., to three or to six measurement positions). An electronic controller 80 may also be deployed in the tool body (or elsewhere in the drill string) and may be configured to control the operation of the electric motor 70 and the gyroscope 62. As described in more detail below, the controller may be further configured to execute the disclosed methods for making gyroscopic surveying measurements.

Gyroscopic surveying tool 50 may be advantageously utilized to make static surveying measurements in a well-bore (e.g., wellbore azimuth measurements). Static surveying measurements are commonly made after drilling has temporarily stopped (e.g., when a new length of drill pipe is added to the drill string) and the drill bit is lifted off bottom. Such static measurements are often made at measured depth intervals ranging from about 30 feet to about 90 feet (e.g., about 10 meters to about 30 meters) during a drilling operation. During a static surveying operation, the gyroscope sensor housing 60 (and gyroscope 62) may be sequentially rotated (using the motor 70) to a number of distinct rotational orientations (e.g., to two or four orientations in embodiments including a dual gyroscopic sensor arrangement or to three or six orientations in embodiments including a single gyroscope). Gyroscope measurements may be made at each of the rotational orientations. Accelerometer measurements may also be made at each of the rotational orientations. The gyroscope and accelerometer measurements may then be processed in combination to compute a wellbore azimuth.

Figure 3A:
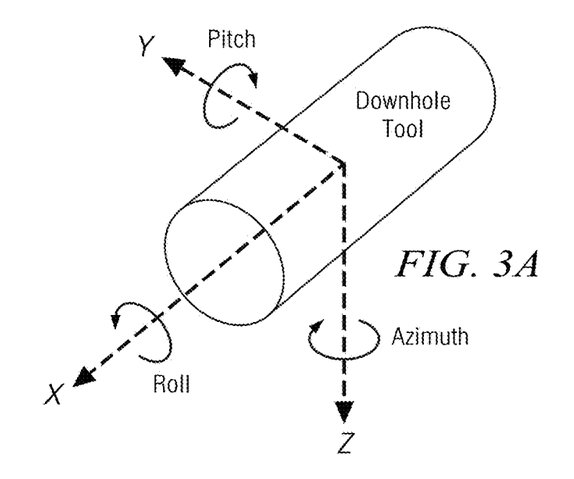
FIG. 3A and FIG. 3B (collectively FIG. 3) depicts example coordinate systems used herein.
Figure 3B:
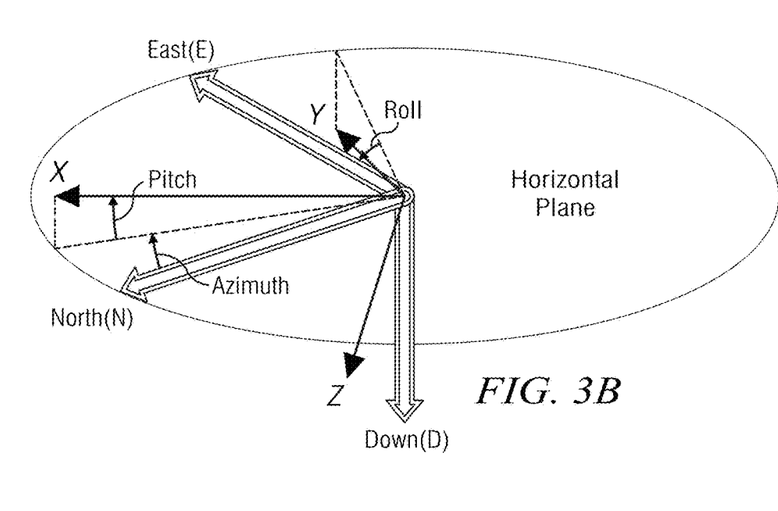

FIGS. 3A and 3B (collectively FIG. 3) depict example coordinate systems used to represent the gyroscopic surveying measurements. A global north-east-down (NED) coordinate system is commonly used in the industry for simplicity (with north and east referring to the north and east directions in the horizontal plane at the surface of the earth and down referring to a direction pointing directly towards the gravitational center of the earth). One common tool coordinate system is also depicted and includes x-, y-, and z-axes in which the x-axis is coincident with a longitudinal axis of the surveying tool pointing in the downhole direction. The y- and z-axes are orthogonal to the x-axis and to one another and together define a cross-axial YZ plane. As further depicted, rotations about the x-, y-, and z-axes are referred to herein as roll ($\phi$), pitch ($\theta$), and azimuth ($\psi$). The azimuth is defined as the angle between the projection of the earth-rate vector onto the horizontal plane and the projection of the x direction (tool axis). The pitch angle is defined as the angle between the x-axis and horizontal plane, while the roll angle is defined as the angle between y-axis and horizontal plan on the YZ plane. It will be appreciated that the roll angle $\phi$ may also be referred to in the industry as the toolface angle and that the pitch angle $\theta$ is related to the inclination (with the pitch angle being defined as the inclination minus ninety degrees). Those of ordinary skill will readily appreciate that mathematical transforms may be used to convert measurements from one coordinate system to another, for example, from the depicted tool coordinate system to the NED coordinate system.

With continued reference to FIG. 3 and reference again to FIG. 2, it will be appreciated that the multiple rotational orientations at which the gyroscope measurements are made are not necessarily coincident with the x-, y-, and z-axes that define the tool coordinate system. In example embodiments, the multiple rotational orientations may be selected to define an alternative tool coordinate system having u-, v-, and w-axes. Measurements made in this UVW coordinate system may be readily transformed to the tool coordinate system (the XYZ coordinate system) using mathematical transforms known to those of ordinary skill in the art.

In one example, nonlimiting, embodiment, the gyroscopic surveying tool 50 may be configured such that six gyroscope measurements are made along the +u, −u, +v, −v, +w, and −w-axes (directions) in the UVW coordinate system. These six axes may be provided by rotating the gyroscope sensor housing 60 at intervals of sixty degrees on the YZ plane. More specifically, the +u-axis is inclined 60° with respect to the −z-axis when it is orthogonally projected on the YZ plane. The −u-axis is inclined 60° with respect to the +z-axis when it is orthogonally projected on the YZ plane. The +v-axis is inclined at 60° with respect to the −z-axis when it is orthogonally projected on the YZ plane. The −v-axis is inclined at 60° with respect to the +z-axis when it is orthogonally projected on the YZ plane. The +w-axis matches the +z-axis when it is orthogonally projected on the YZ plane. The −w-axis matches the −z-axis when it is orthogonally projected on the YZ plane. More detail regarding this example gyroscopic surveying tool embodiment may be found in U.S. Pat. Nos. 8,528,220 and 10,982,530.

It will be appreciated that a minimum of three separate (independent) measurements of the gravitational acceleration and the earth-rotation angular velocity need to be acquired in order to compute or estimate the azimuth angle. When these measurements are made in the direction of the tool (XYZ) coordinate system, the gyroscope measurements are denoted ($\omega_x$, $\omega_y$, $\omega_z$) and the accelerometer measurements are denoted ($g_x$, $g_y$, $g_z$). Likewise, measurements made in the UVW coordinate system are denoted ($\omega_u$, $\omega_v$, $\omega_w$) and ($g_u$, $g_v$, $g_w$). It will be understood, without loss of generality, that gyroscope and accelerometer measurements may be made on any independent coordinate system (e.g., the UVW coordinate system) and then transformed into the tool coordinate system (the XYZ coordinate system) using rotation matrices. Such mathematical techniques are well known to those of ordinary skill in the art.

The coordinate transfer matrix from the NED coordinate system to the XYZ coordinate system is represented based on the Eulerian angle definition $$C_\psi = \begin{bmatrix} \cos\psi & \sin\psi & 0 \\ -\sin\psi & \cos\psi & 0 \\ 0 & 0 & 1 \end{bmatrix},$$

$$C_\theta = \begin{bmatrix} \cos\theta & 0 & -\sin\theta \\ 0 & 1 & 0 \\ \sin\theta & 0 & \cos\theta \end{bmatrix},$$

$$C_\phi = \begin{bmatrix} 1 & 0 & 0 \\ 0 & \cos\phi & \sin\phi \\ 0 & -\sin\phi & \cos\phi \end{bmatrix}.$$

Since the rotation for the Eulerian angle definition should be described in order of azimuth, pitch and roll angle, the coordinate transfer matrix $C_{NED}^{XYZ}$ becomes $$C_{NED}^{XYZ} = $$

$$C_\phi C_\theta C_\psi = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix},$$

By definition the Earth's gravity (g) is parallel to the NED down direction such that:

$$\vec{g}_{NED} = \begin{bmatrix} g_N \\ g_E \\ g_D \end{bmatrix} = \begin{bmatrix} 0 \\ 0 \\ g \end{bmatrix}. \quad (1)$$

Therefore:

$$\vec{g}_{XYZ} = \begin{bmatrix} g_x \\ g_y \\ g_z \end{bmatrix} = C_{XYZ}^{NED} \vec{g}_{NED} = \begin{bmatrix} -g\sin\theta \\ g\sin\phi\cos\theta \\ g\cos\phi\cos\theta \end{bmatrix}$$

The earth-rotation component ($\Omega$) can be described by following matrix relationship:

$$\vec{\Omega}_{NED} = \begin{bmatrix} \omega_N \\ \omega_E \\ \omega_D \end{bmatrix} = \begin{bmatrix} \Omega\cos\lambda \\ 0 \\ -\Omega\sin\lambda \end{bmatrix}$$

where $\lambda$ represents the latitude of the measurement (or observation) and $\Omega$ represents the angular velocity of the earth's rotation (e.g., $\Omega$=15.0411 degrees per hour).

In the XYZ (tool) coordinate system the angular velocity of the earth's rotation may be given, for example, as follows:

$$\vec{\Omega}_{XYZ} = \begin{bmatrix} \omega_x \\ \omega_y \\ \omega_z \end{bmatrix} = C_{XYZ}^{NED} \vec{\Omega}_{NED} = C_\phi C_\theta C_\psi \begin{bmatrix} \Omega\cos\lambda \\ 0 \\ -\Omega\sin\lambda \end{bmatrix} \quad (2)$$

Based on the foregoing, the azimuth $\psi$ may be calculated using any one or more of the following three independent equations in which $\cos\theta$, $\sin\theta$, $\cos\phi$, and $\sin\phi$ may be determined from the accelerometer measurement using techniques known to those of ordinary skill and as indicated above by $\vec{g}_{XYZ}$ in Eq. 1.

$$\cos\psi = \frac{1}{\Omega\cos\lambda}(\omega_x\cos\theta + \omega_y\sin\phi\sin\theta + \omega_z\cos\phi\sin\theta) \quad (3)$$

$$\sin\psi = \frac{1}{\Omega\cos\lambda}(-\omega_y\cos\phi + \omega_z\sin\phi) \quad (4)$$

$$\tan\psi = \frac{-\omega_y\cos\phi + \omega_z\sin\phi}{\omega_x\cos\theta + \omega_y\sin\phi\sin\theta + \omega_z\cos\phi\sin\theta} \quad (5)$$

From the foregoing equations, it is clear that the sensitivity of the computed azimuth depends on the pitch and roll angles of the gyroscopic survey tool (e.g., tool 50). Since each measurement provided by the accelerometer(s) exhibits some level of noise, the measurement error of each accelerometer measurement may be attenuated or amplified depending on the trigonometric functions associated with the pitch and roll angles. For example, in the $\sin\psi$ equation, the azimuth is highly sensitive to $\omega_y$ and insensitive (or has minimal sensitivity) to $\omega_z$ when the roll angle $\phi$=0, since cos 0=1 and sin 0=0. Similarly, the azimuth is highly sensitive to $\omega_z$ and insensitive (or has minimal sensitivity) to $\omega_y$ when the roll angle $\phi$=90.

Figure 4A:
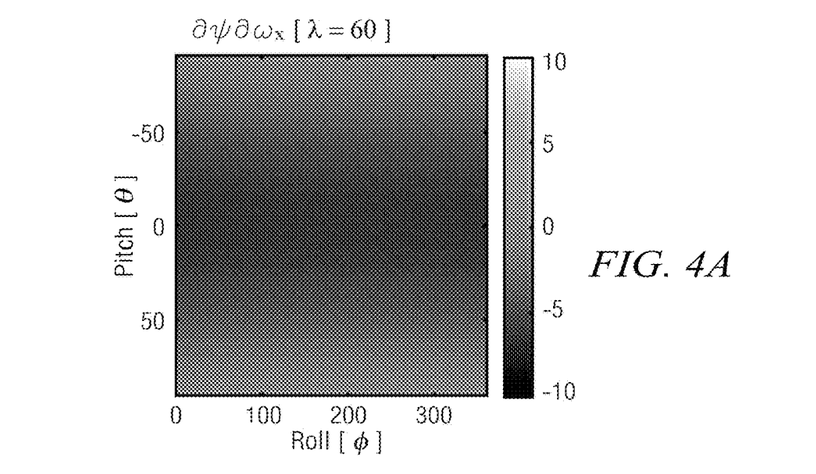
FIGS. 4A, 4B, and 4C (collectively FIG. 4) depict contour maps showing the azimuth sensitivity to changes in x-axis, y-axis, and z-axis gyroscope measurements.
Figure 4B:
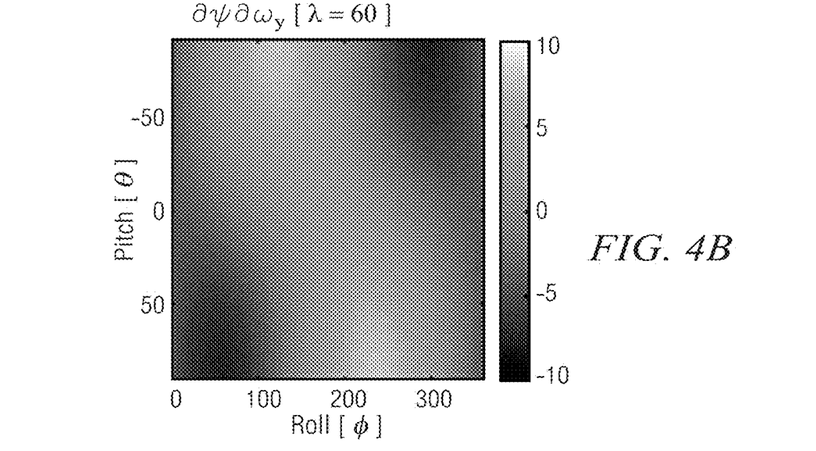
Figure 4C:
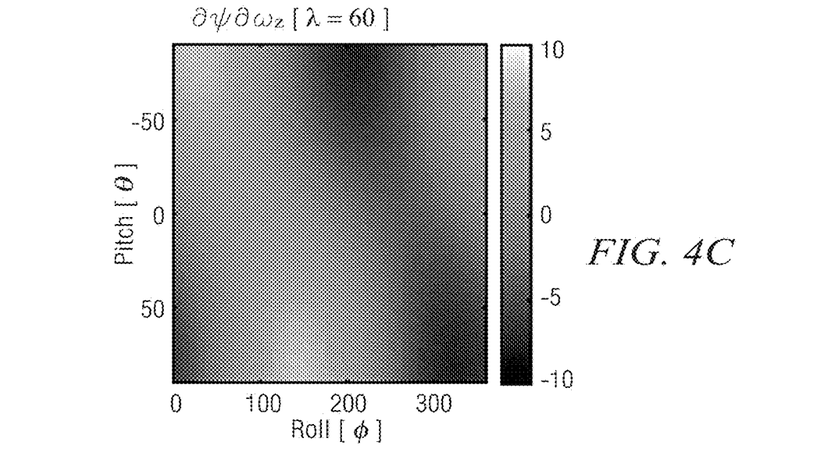

FIGS. 4A, 4B, and 4C (collectively FIG. 4) depict contour maps showing the sensitivity of the azimuth to changes in $\omega_x$ (4A), $\omega_y$ (4B), and $\omega_z$ (4C) based on Eq. 5. In these example contour maps, the sensitivity is defined as the partial derivative of the azimuth with respect to the gyroscopic measurement components $\omega_x$, $\omega_y$, or $\omega_z$ as indicated. Note that the sensitivity is clearly related to the pitch and roll angles. For example, the absolute value of the sensitivity of the azimuth to changes in $\omega_x$ is independent of the roll angle and is a maximum a pitch angle of zero and is near zero at pitch angles of ±90 degrees. The sensitivity of the azimuth to $\omega_y$ and $\omega_z$ is mathematically more complex.

In example embodiments in which the gyroscopic survey tool has one or two distinct gyroscopic sensors (i.e., in which the one or two distinct gyroscopic sensors are used to obtain the at least three independent measurements), the total acquisition duration (time) must be shared to accommodate the measurement of three (or more) distinct measurement directions (e.g., along the six axes described above). The total acquisition time is conventionally divided equally such that the gyroscopic measurements have the same noise levels along each measurement axis. One aspect of the disclosed embodiments was the realization that the accuracy of the computed azimuth may be improved by modifying the duration of the acquisition of each gyroscopic measurement. In particular it was realized that gyroscopic measurement components (e.g., $\omega_y$) having higher sensitivity may be sampled longer than gyroscopic measurement components (e.g., $\omega_z$) having lower sensitivity so as to reduce the noise in the most sensitive components. It was further realized that the particular components having high or low sensitivity depends on the pitch and roll angles of the gyroscopic measurement tool and may also further depend on the measured azimuth and the wellbore latitude.

Figure 5:
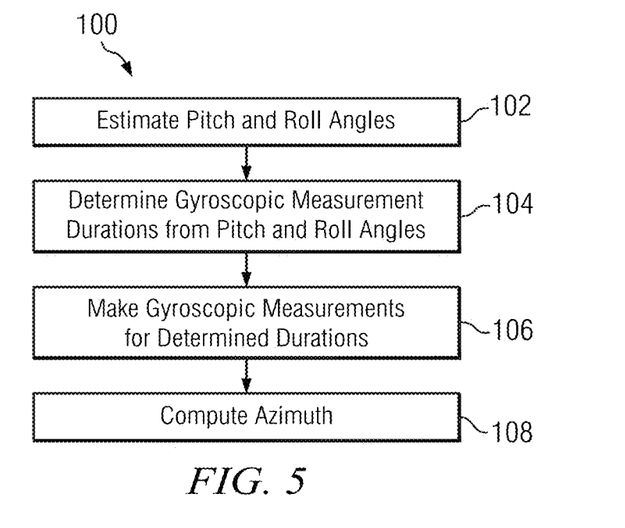
FIG. 5 depicts a flow chart of one example method for making gyroscopic surveying measurements.

FIG. 5 depicts a flow diagram of one example method 100 for making gyroscopic surveying measurements (e.g., azimuth measurements). Accelerometer measurements (e.g., independent accelerometer measurements made elsewhere in the tool or elsewhere in the drill string) are evaluated to estimate the pitch and roll angles of the gyroscopic surveying tool at 102. The estimated pitch and roll angles may be evaluated at 104 to determine a measurement duration for each gyroscopic measurement (e.g., along each of the three or six axes in the UVW coordinate system). It will be appreciated that these measurement durations are generally not equal to one another. While not depicted in this example embodiment, it will be appreciated that the determination at 104 may further make use of the previous (or most recent) azimuth measurement and the latitude of the drilling operation (e.g., of the pad or rig). The gyroscope measurements are then made at 106 using the measurement durations determined in 104. For example, a first gyroscopic measurement may be made for a first determined duration when the gyroscope sensor housing is in a first rotational position. The sensor housing may then be rotated to a second position and a second gyroscopic measurement may be made for a second determined duration. And so on until up to six or more gyroscopic measurements have been made. Corresponding accelerometer measurements may also be made while making the gyroscopic measurements at 106. These accelerometer and gyroscope measurements may then be used to compute the azimuth angle at 108, for example, using one or more of Eqs. (3)-(5).

To minimize the overhead associated with the estimation in 102, it may be advantageous to use any other information readily available prior to the survey. For example, many downhole tools make use of multiple accelerometers/vibration sensors. These sensors are normally used to monitor vibrational conditions of the surveying and the drilling environment but can also be used to estimate the pitch and roll angles of the survey tool (with sufficient accuracy to determine the measurement duration for each gyroscopic measurement at 104.

In example embodiments the gyroscopic surveying tool 50 (FIGS. 1 and 2) may include a triaxial accelerometer set in which two of the accelerometers include low-cost vibration sensors and one of the accelerometers is a high precision accelerometer that is used for making surveying measurements. Since the high precision accelerometer is indexed to a particular position just before starting the survey, a three dimensional gravity vector may be determined, for example, as follows:

$$\begin{pmatrix} g_x \\ g_y \\ g_z \end{pmatrix} = R_{index} \begin{pmatrix} a_{vibration1} \\ a_{vibration2} \\ a_{surveying} \end{pmatrix}$$

where $a_{vibration1}$ and $a_{vibration2}$ represent the accelerometer measurements made by the low cost vibration sensors, $a_{surveying}$ represents the accelerometer measurement from the high-precision accelerometer, and $R_{index}$ represents a rotation matrix from the coordinate system of the triaxial accelerometer set to the tool (XYZ) coordinate system. The components of $R_{index}$ are related to the indexing position of the high precision accelerometer. The pitch and roll angles may then be computed from the estimated gravity vector, for example, using Eq. (1).

Figure 6:
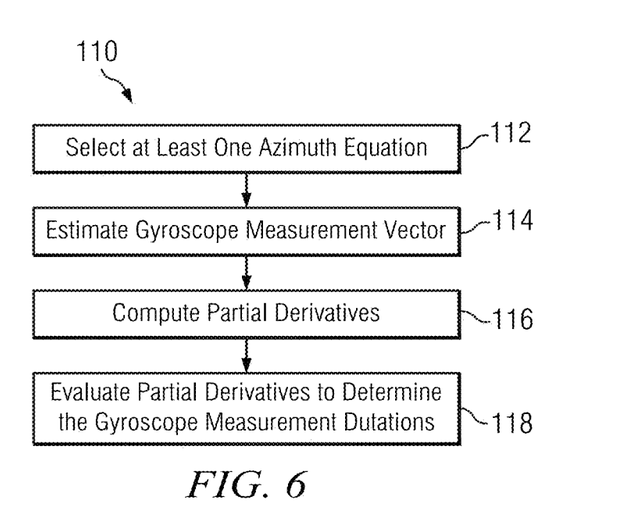
FIG. 6 depicts a flow chart of an example method for determining acquisition times for each of a plurality of gyroscope measurements.

With continued reference to FIG. 5 and further reference now to FIG. 6, a flow chart of one example method 110 for determining the measurement durations in 104 is depicted. One or more of the cos ψ, sin ψ, and tan ψ equations (Eqs. 3-5) relating the azimuth and the gyroscope measurements may be selected at 112. In certain example embodiments, the equation may be preselected, for example, based on the well plan and an expected range of wellbore azimuths. In other example embodiments, the equation (or equations) may be selected based on the estimated pitch and roll angles obtained in 102 or based on the previously measured azimuth value ψ[k−1] or some other estimation of the expected azimuth value. The wellbore latitude may also be considered, particularly for the cos ψ and sin ψ equations. The previously determined azimuth ψ[k−1] may be evaluated at 114 to estimate a gyroscope measurement vector (e.g., $\omega_x$, $\omega_y$, and $\omega_z$ or $\omega_u$, $\omega_v$, and $\omega_w$).

One or more partial derivatives of the azimuth with respect to the gyroscopic measurements may be computed at 116, for example, using the pitch and roll angles obtained in 102 and the estimated gyroscope measurement vector obtained in 114. Such partial derivatives may include, for example, $\partial\psi/\partial w_x$, $\partial\psi/\partial w_y$, and $\partial\psi/\partial w_z$ or $\partial\psi/\partial w_u$, $\partial\psi/\partial w_v$, and $\partial\psi/\partial w_w$. The partial derivatives may be computed using mathematical expressions derived by differentiating one or more of Eqs. 3-5. Such expressions may be of the following form:

$$\frac{\partial \psi}{\partial w_x} = f_x(\phi, \theta, w_x, w_y, w_z)$$

$$\frac{\partial \psi}{\partial w_y} = f_y(\phi, \theta, w_x, w_y, w_z)$$

$$\frac{\partial \psi}{\partial w_z} = f_z(\phi, \theta, w_x, w_y, w_z)$$

or $$\frac{\partial \psi}{\partial w_u} = f_u(\phi, \theta, w_u, w_v, w_w)$$

$$\frac{\partial \psi}{\partial w_v} = f_v(\phi, \theta, w_u, w_v, w_w)$$

$$\frac{\partial \psi}{\partial w_z} = f_w(\phi, \theta, w_u, w_v, w_w)$$

where $f_x$, $f_y$, and $f_z$ or $f_u$, $f_v$, and $f_w$ represent mathematical equations relating the partial derivatives to the pitch and roll angles and the gyroscope measurement vector. It will be appreciated that the computation at 116 may alternatively and/or additionally make use of polynomial (or other) mathematical approximations of these equations or may interpolate a look-up table of precomputed partial derivatives.

With continued reference to FIG. 6, the computed partial derivatives may then be evaluated at 118 to determine the measurement durations for each of the gyroscope measurements (e.g., at each of the aforementioned rotational orientations gyroscope). In one example embodiment, the durations may be proportional to the partial derivatives computed in 116. For example only, the durations of the $w_x$, $w_y$, and $w_z$ measurements may be proportional to $\partial\psi/\partial w_x$, $\partial\psi/\partial w_y$, and $\partial\psi/\partial w_z$ (or the durations of the $w_u$, $w_y$, and $w_w$ measurements may be proportional to $\partial\psi/\partial w_u$, $\partial\psi/\partial \omega_v$, and $\partial\psi/\partial w_w$). This may be expressed mathematically, for example, as follows:

$$D(w_i) = T \frac{\partial \psi / \partial w_i}{\sum \partial \psi / \partial w_i}$$

where $D(w_i)$ represents the duration of each of the gyroscope measurement components $w_i$ (e.g., the durations of the $w_x$, $w_y$, and $w_z$ measurements), T represents the total time available for making the gyroscope measurements, $\partial\psi/\partial w_i$ represents the partial derivative of azimuth with respect to the gyroscope measurement component $w_i$ and $\tau\partial\psi/\partial w_i$ represents the sum of the partial derivatives of each component (e.g., the sum of $\psi/\partial w_x$, $\partial\psi/\partial w_y$, and $\partial\psi/\partial w_z$).

It will be appreciated that the methods described herein may be configured for implementation via one or more controllers deployed downhole (e.g., controller 80 in FIG. 2). A suitable controller may include, for example, a programmable processor, such as a digital signal processor or other microprocessor or microcontroller and processor-readable or computer-readable program code embodying logic. A suitable processor may be utilized, for example, to execute the method embodiments (or various steps in the method embodiments) described above with respect to FIGS. 5 and 6. A suitable controller may also optionally include other controllable components, such as sensors (e.g., a temperature sensor), data storage devices, power supplies, timers, and the like. The controller may also be disposed to be in electronic communication with the accelerometers and magnetometers. A suitable controller may also optionally communicate with other instruments in the drill string, such as, for example, telemetry systems that communicate with the surface. A suitable controller may further optionally include volatile or non-volatile memory or a data storage device.

With further reference to the methods disclosed in FIGS. 5 and 6, it will be appreciated that the computed survey parameters (e.g., the computed azimuth) may be stored in downhole memory and/or transmitted to the surface, for example, via mud pulse telemetry, electromagnetic telemetry, wired drill pipe, or other telemetry techniques. In view of the computed azimuth the direction of drilling may be changed. For example, in many drilling operations the wellbore (or a portion of the wellbore) is drilled along a drill plan, such as a predetermined direction (e.g., as defined by the wellbore inclination and the wellbore azimuth) or a predetermined curvature. In some embodiments, the computed azimuth may be compared with a desired azimuth. The drilling direction may be changed, for example, in order to meet the drill plan, or when the difference between the computed and desired azimuth (or change in azimuth) exceeds a predetermined threshold. Such a change in drilling direction may be implemented, for example, via actuating steering elements in a steering tool.

Although smart data acquisition for gyrocompass acquisitions and certain advantages thereof have been described in detail, it should be understood that various changes, substitutions and alterations may be made herein without departing from the spirit and scope of the disclosure.

The invention claimed is:

1. A method for surveying a wellbore, the method comprising:
   deploying a gyroscopic surveying tool in the wellbore, the gyroscopic surveying tool including at least one gyroscope disposed to rotate in and with respect to a tool housing, wherein the gyroscopic surveying tool includes a micro electro mechanical systems (MEMS) gyroscope;
   determining a pitch angle and a roll angle of the gyroscopic surveying tool in the wellbore;
   determining, using the pitch angle and the roll angle, a plurality of measurement durations, each measurement duration of the plurality of measurement durations associated with an associated gyroscope measurement of a plurality of gyroscope measurements, wherein each of the plurality of gyroscope measurements has an associated rotational position of a plurality of rotational positions in the tool housing;
   measuring the plurality of gyroscope measurements for the plurality of measurement durations when the at least one gyroscope is disposed at the associated rotational position of the plurality of rotational positions; and
   computing an azimuth of the wellbore from the plurality of gyroscope measurements.

2. The method of claim 1, wherein the plurality of measurement durations for the plurality of gyroscope measurements are proportional to a plurality of azimuth sensitivities of the azimuth to each of the plurality of gyroscope measurements.

3. The method of claim 1, wherein the plurality of measurement durations for the plurality of gyroscope measurements are not equal to one another.

4. The method of claim 1, wherein:
   the gyroscopic surveying tool comprises a single-axis gyroscope disposed to rotate between at least a first rotational position, a second rotational position, and a third rotational position in the tool housing;
   the determining the plurality of measurement durations comprises determining a measurement duration of the plurality of measurement durations for each of at least a first gyroscope measurement, a second gyroscope measurement, and a third gyroscope measurement of the plurality of gyroscope measurements made at the first rotational position, the second rotational position, and the third rotational position of the plurality of rotational positions using the pitch angle and the roll angle; and
   the measuring of the plurality of gyroscope measurements comprises measuring the first gyroscope measurement, the second gyroscope measurement, and the third gyroscope measurement of the plurality of gyroscope measurements at the first rotational position, the second rotational position, and the third rotational position of the plurality of rotational positions using the plurality of measurement durations.

5. The method of claim 1, wherein the pitch angle and the roll angle are determined using a plurality of accelerometer measurements from at least one accelerometer.

6. The method of claim 5, wherein the at least one accelerometer includes a tri-axial accelerometer set, and wherein the plurality of accelerometer measurements are made using the tri-axial accelerometer set including a first vibration sensor, a second vibration sensor, and a high precision accelerometer.

7. The method of claim 1, wherein the determining the plurality of measurement durations comprises determining the plurality of measurement durations using a previously computed azimuth.

8. The method of claim 7, wherein the determining the plurality of measurement durations further comprises:
   determining a first component, a second component, and a third component of a gyroscope measurement vector from the previously computed azimuth;
   evaluating the first component, the second component, and the third component of the gyroscope measurement vector and the pitch angle and the roll angle to compute partial derivatives of the azimuth with respect to the first component, the second component, and the third component of the gyroscope measurement vector; and
   determining the plurality of measurement durations from the partial derivatives.

9. The method of claim 8, wherein the plurality of measurement durations are proportional to the partial derivatives.

10. The method of claim 1, wherein computing the azimuth of the wellbore includes evaluating the pitch angle and the roll angle or a previously computed azimuth to select one or more equations for computing the azimuth.

11. A gyroscopic surveying tool comprising:
   at least one gyroscope deployed in and disposed to rotate with respect to a tool housing, wherein the at least one gyroscope includes a micro electro mechanical systems (MEMS) gyroscope; and
   a processor configured to:
      determine a pitch angle and a roll angle of the gyroscopic surveying tool in a wellbore;
      determine, using the pitch angle and the roll angle, a plurality of measurement durations, each measurement duration of the plurality of measurement durations associated with an associated gyroscope measurement of a plurality of gyroscope measurements, wherein each of the plurality of gyroscope measurements has an associated rotational position of a plurality of rotational positions in the tool housing;

measure the plurality of gyroscope measurements for the plurality of measurement durations when the at least one gyroscope is disposed at the associated rotational position of the plurality of rotational positions; and compute an azimuth of the wellbore from the plurality of gyroscope measurements.

12. The gyroscopic surveying tool of claim 11, wherein:

the at least one gyroscope includes a single-axis gyroscope disposed to rotate between at least a first rotational position, a second rotational position, and a third rotational position in the tool housing; and the processor is configured to:

determine the plurality of measurement durations for each of at least a first gyroscope measurement, a second gyroscope measurement, and a third gyroscope measurement of the plurality of gyroscope measurements made at the at least-first rotational position, the second rotational position, and the third rotational position of the plurality of rotational positions using the pitch angle and the roll angle; and measure the first gyroscope measurement, the second gyroscope measurement, and the third gyroscope measurement of the plurality of gyroscope measurements at the first rotational position, the second rotational position, and the third rotational position of the plurality of rotational positions using the plurality of measurement durations.

13. The gyroscopic surveying tool of claim 11, wherein determining the plurality of measurement durations comprises determining the plurality of measurement durations using a previously computed azimuth.

14. The gyroscopic surveying tool of claim 13, wherein determining the plurality of measurement durations further comprises:

determining a first component, a second component, and a third component of a gyroscope measurement vector from the previously computed azimuth;

evaluating the first component, the second component, and the third component of the gyroscope measurement vector and the pitch angle and the roll angle to compute partial derivatives of the azimuth with respect to the first component, the second component, and the third component of the gyroscope measurement vector; and determine the plurality of measurement durations from the partial derivatives.

15. The gyroscopic surveying tool of claim 14, wherein the plurality of measurement durations are proportional to the partial derivatives.

16. A method for surveying a wellbore, the method comprising:

deploying a gyroscopic surveying tool in the wellbore, the gyroscopic surveying tool including a single axis gyroscope disposed to rotate in and with respect to a tool housing, wherein the gyroscopic surveying tool includes a micro electro mechanical systems (MEMS) gyroscope;

computing a pitch angle and a roll angle of the gyroscopic surveying tool in the wellbore;

determining a first measurement duration, a second measurement duration, and a third measurement duration corresponding to a first gyroscope measurement, a second gyroscope measurement, and a third gyroscope measurement from the pitch angle and the roll angle;

measuring the first gyroscope measurement, the second gyroscope measurement, and the third gyroscope measurement at the first measurement duration, the second measurement duration, and the third measurement duration, respectively, when the single axis gyroscope is disposed at a corresponding first rotational position, second rotational position, and third rotational position in the tool housing; and computing an azimuth of the wellbore from the first gyroscope measurement, the second gyroscope measurement, and the third gyroscope measurement.

17. The method of claim 16, wherein computing the pitch angle and the roll angle includes computing the pitch angle and the roll angle using accelerometer measurements from at least one accelerometer.

18. The method of claim 16, wherein determining the first measurement duration, the second measurement duration, and the third measurement duration comprises determining the first measurement duration, the second measurement duration, and the third measurement duration using a previously computed azimuth.

19. The method of claim 18, wherein the determining the first measurement duration, the second measurement duration, and the third measurement duration further comprises:

computing a first component, a second component, and a third component of a gyroscope measurement vector from the previously computed azimuth;

evaluating the first component, the second component, and the third component of the gyroscope measurement vector and the pitch angle and the roll angle to compute partial derivatives of the azimuth with respect to the first component, the second component, and the third component of the gyroscope measurement vector; and determining the first measurement duration, the second measurement duration, and the third measurement duration from the partial derivatives.

20. The method of claim 1, wherein the plurality of measurement durations have a total acquisition time, and wherein determining the plurality of measurement durations includes determining the plurality of measurement durations such that a sum of the plurality of measurement durations is less than or equal to the total acquisition time.

* * * * *